(12) United States Patent
Takechi

(10) Patent No.: US 8,109,328 B2
(45) Date of Patent: Feb. 7, 2012

(54) FLUID TEMPERATURE CONTROL DEVICE

(75) Inventor: Hiroaki Takechi, Hadano (JP)

(73) Assignee: Kelk Ltd., Kanagawa (JP)

( * ) Notice: Subject to any disclaimer, the term of this patent is extended or adjusted under 35 U.S.C. 154(b) by 451 days.

(21) Appl. No.: 12/071,047

(22) Filed: Feb. 14, 2008

(65) Prior Publication Data

US 2008/0196863 A1 Aug. 21, 2008

(30) Foreign Application Priority Data

Feb. 16, 2007 (JP) ................................ 2007-036592

(51) Int. Cl.
  *F25B 29/00* (2006.01)
(52) U.S. Cl. ......... 165/263; 165/264; 165/48.1; 165/63; 165/64; 62/3.3; 62/3.7; 392/484; 392/480
(58) Field of Classification Search .................. 165/48.1, 165/63, 64, 263, 264; 62/3.3, 3.7; 392/484, 392/480
See application file for complete search history.

(56) References Cited

U.S. PATENT DOCUMENTS

| | | | | |
|---|---|---|---|---|
| 3,262,492 A | * | 7/1966 | Meenan | 165/259 |
| 6,666,031 B2 | * | 12/2003 | Ohkubo et al. | 62/3.3 |
| 6,694,747 B2 | * | 2/2004 | Nagai et al. | 62/3.3 |
| 6,782,195 B2 | * | 8/2004 | Abras et al. | 392/480 |
| 7,744,699 B2 | * | 6/2010 | Kado et al. | 134/18 |

FOREIGN PATENT DOCUMENTS

| | | | |
|---|---|---|---|
| CN | 1861357 A | * | 11/2006 |
| JP | 2000124178 A | * | 4/2000 |
| JP | 2000235971 A | * | 8/2000 |
| JP | 2001237284 A | * | 8/2001 |
| JP | 2001297977 A | * | 10/2001 |
| JP | 2003-337626 | | 11/2003 |
| JP | 2004-172628 | | 6/2004 |
| JP | 2006-269617 | | 10/2006 |
| SU | 1736483 A1 | * | 5/1992 |

OTHER PUBLICATIONS

Japanese Office Action (and English translation) issued Nov. 8, 2011 in Japanese Application No. 2007-036592, which is a foreign counterpart of the present application.

* cited by examiner

*Primary Examiner* — John Ford
(74) *Attorney, Agent, or Firm* — Wenderoth, Lind & Ponack, L.L.P.

(57) ABSTRACT

A fluid temperature control device, which is particularly suitably applied to the temperature control of a processing liquid in a semiconductor device manufacturing process, capable of performing quickly and precisely the temperature control of a temperature-controlled fluid, and the device can also be made as small as possible. This fluid temperature control device includes a body block having flow passage grooves formed therein; heat transfer plates which are disposed on surfaces of the body block to form flow passages where a temperature-controlled fluid flows; heaters which heat the temperature-controlled fluid flowing through the flow passages via at least one of the heat transfer plates; and thermoelectric modules which heat and cool the temperature-controlled fluid flowing through the flow passages via at least one of the heat transfer plates.

4 Claims, 4 Drawing Sheets

FLUID TEMPERATURE CONTROL DEVICE

BACKGROUND OF THE INVENTION

1. Field of the Invention

The present invention relates to a fluid temperature control device, and more particularly to a structure of a fluid temperature control device which is suitably applied to temperature control of a processing liquid in a semiconductor device manufacturing process.

2. Description of the Related Art

For example, the semiconductor device manufacturing field adopts a fluid temperature control device which uses a thermoelectric module to heat/cool the processing liquid or a fluid temperature control device which uses a heater to heat the processing liquid for temperature control of the processing liquid in various manufacturing processes.

For a case where a temperature of the processing liquid is controlled in a wide range or where the processing liquid is required to be heated quickly, there is provided a fluid temperature control device which is comprised of the above-described thermoelectric module and heater in combination (Japanese Patent application Laid-open No. 2006-269617, for example).

FIG. 4 shows a substrate processing system which performs processes such as cleaning, etching and the like of a substrate such as a semiconductor wafer, a glass substrate or the like by immersing in a processing liquid, and this substrate processing system A has a processing tank T which accumulates the processing liquid and a piping S which connects an outer tank To and an inner tank Ti of the processing tank T. The piping S is provided with a pump P which circulates the processing liquid discharged from the outer tank To to the inner tank Ti, a fluid temperature control device B and a filter F.

The fluid temperature control device B is comprised of an electronic cooling/heating unit U using a thermoelectric module and a heater H which are connected in series. A processing liquid (temperature-controlled fluid) L, which is sent from the outer tank To of the processing tank T to the fluid temperature control device B by the operation of the pump P as indicated by arrows a, b, c, is heated/cooled by the electronic cooling/heating unit U, then sent to the heater H as indicated by an arrow d and heated therein. The processing liquid L which is adjusted to a desired temperature by the operations of the electronic cooling/heating unit U and the heater H is circulated from the fluid temperature control device B to the inner tank Ti of the processing tank T through the filter F.

The fluid temperature control device B of the above-described substrate processing system A is configured of the electronic cooling/heating unit U and the heater H which are independently disposed from each other and mutually connected through the pipe. Therefore, it is hard to adjust the temperature of the processing liquid (liquid temperature-controlled fluid) quickly and precisely, and an installation space is increased because an overall size becomes large, resulting in a problem of increasing the size of the substrate processing system A.

Under the circumstances described above, the present invention provides a fluid temperature control device which can adjust a temperature of a temperature-controlled fluid quickly and precisely and which can also be made as small as possible.

SUMMARY OF THE INVENTION

A first aspect of the invention provides a fluid temperature control device that includes a body block having flow passage grooves formed therein; heat transfer plates which are disposed on surfaces of the body block to form flow passages through which a temperature-controlled fluid flows; heaters which heat the temperature-controlled fluid flowing through the flow passages via at least one of the heat transfer plates; thermoelectric modules which heat and cool the temperature-controlled fluid flowing through the flow passages via at least one of the heat transfer plates, with the thermoelectric modules being thermally connected to the heat transfer plates via an insulating layer; and a water jacket thermally connected to the thermoelectric modules via the insulating layer, wherein the fluid temperature control device further comprises a sensor for measuring temperatures of outer surfaces of the heat transfer plates, the outer surfaces being in contact with the thermoelectric modules, and wherein heating capabilities of the heaters upon the temperature-controlled fluid are set to be higher than those of the thermoelectric modules upon the temperature-controlled fluid.

According to the fluid temperature control device of the first aspect of the invention, the temperature-controlled fluid is heated by the heaters via at least one of the heat transfer plate, and the temperature-controlled fluid is heated/cooled by the thermoelectric modules via at least one of the heat transfer plates. Therefore, it becomes possible to adjust the temperature of the temperature-controlled fluid quickly and precisely in comparison with the conventional fluid temperature control device which sends the temperature-controlled fluid heated/cooled by the electronic cooling/heating unit to the heater to heat it.

According to the fluid temperature control device of the first aspect of the invention, the heaters, which heat the temperature-controlled fluid via the heat transfer plate disposed on the surface of the body block, and the thermoelectric modules, which heat/cool the temperature-controlled fluid via the heat transfer plate, are disposed within or in contact with the heat transfer plate. Therefore, the body block, the heat transfer plates, the heaters and thermoelectric modules are disposed very close to one another, and it becomes possible to make the fluid temperature control device as small as possible.

A second aspect of the invention provides the fluid temperature control device according to the first aspect of the invention, wherein the thermoelectric modules are disposed on an outer surface of at least one of the heat transfer plates.

According to the fluid temperature control device of the second aspect of the invention, the heaters are disposed within the heat transfer plate, and the thermoelectric modules are disposed on the outer surface of the heat transfer plate. Therefore, to heat the temperature-controlled fluid in the flow passages by the heaters, the outer surface of the heat transfer plate is heated by the thermoelectric modules, the heat of the heaters is prevented from escaping from the outer surface of the heat transfer plate via the thermoelectric modules, and the temperature-controlled fluid in the flow passages can be heated efficiently.

A third aspect of the invention provides the fluid temperature control device according to the first or second aspect of the invention, wherein three heaters are disposed within at least one of the heat transfer plates.

According to the fluid temperature control device of the third aspect of the invention, the heating capabilities of the heaters upon the temperature-controlled fluid are set to be higher than those of the thermoelectric modules upon the temperature-controlled fluid. Therefore, when the temperature-controlled fluid is heated by the heaters and the thermoelectric modules, the temperatures of the thermoelectric modules on the heating side can be suppressed to a low level, and the lives of the thermoelectric modules can be prevented from being decreased by a junction temperature.

A fourth aspect of the invention provides the fluid temperature control device according to the first aspect of the invention, wherein multiple heaters are disposed within each heat transfer plate.

DETAILED DESCRIPTION OF THE INVENTION

The present invention is described in detail below with reference to the drawings showing embodiments.

Figure 1:
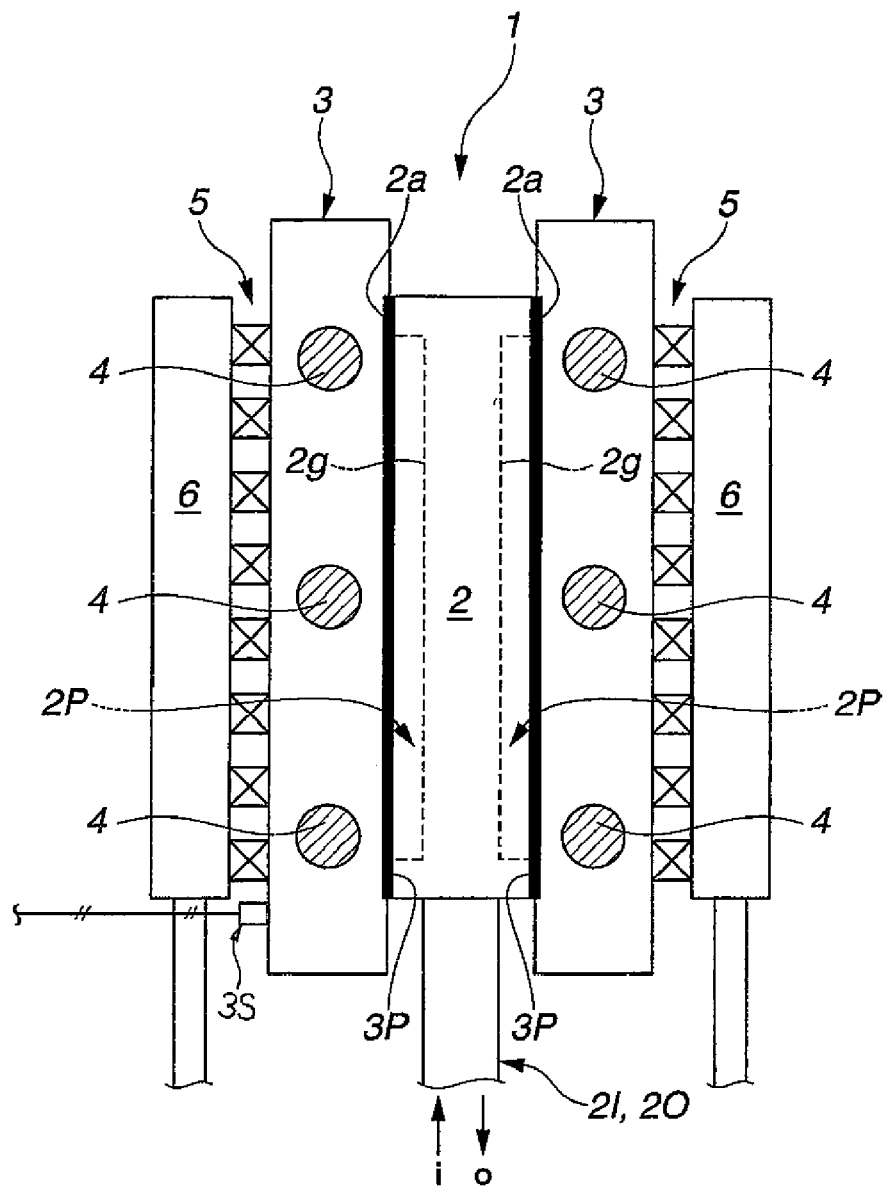
FIG. 1 is a schematic entire plan view showing an embodiment of the fluid temperature control device of the invention.

FIG. 1 shows an example of applying the fluid temperature control device of the invention to a fluid temperature control device for adjusting the temperature in a range of about of 10° C. to about 80° C. of a chemical solution (temperature-controlled fluid) used in a semiconductor device manufacturing process, and specifically an acid chemical solution such as an ammonia/hydrogen peroxide solution, a hydrochloric acid/hydrogen peroxide solution or the like which is used for a wet process (RCA cleaning), wet etching or the like. The above-described fluid temperature control device 1 has a body block 2 where the chemical solution is fed/discharged and a heat transfer plate 3 which is placed on each surface 2a of the body block 2. Heaters 4 are disposed within the heat transfer plates 3, a Peltier module (thermoelectric module) 5 is attached to an outer surface of the each heat transfer plate 3, and a water jacket 6 is attached to the each Peltier module 5 to perform heat radiation removal/heat supply of the Peltier module 5.

A flow passage 2P is formed between the body block 2 and the heat transfer plate 3, and the chemical solution flowing through the flow passage 2P comes into contact with the heat transfer plate 3. Thus, heat exchange is performed among the heater 4, the Peltier module 5 and the chemical solution via the heat transfer plate 3 to adjust the temperature of the chemical solution.

The body block 2 is formed of a resin material such as Teflon (registered trade name) or the like which has corrosion resistance to the chemical solution, the right and left surfaces 2a, 2a are provided with flow passage grooves 2g, 2g, and the body block 2 is provided with a feed pipe 21 and a discharge pipe 20 which are communicated with the flow passage grooves 2g, 2g.

Meanwhile, the heat transfer plate 3 which is attached to the surface 2a of the body block 2 is a flat-shaped block formed of a metal material such as aluminum having a good thermal conductivity, and a corrosion-resisting plate 3P which corresponds to the entire area of the flow passage groove 2g is fixed to the surface opposite to the body block 2.

Incidentally, the corrosion-resisting plate 3P is formed of amorphous carbon which has corrosion resistance against a chemical solution and a good thermal conductivity.

The heat transfer plates 3 each are attached to the right and left surfaces 2a, 2a of the body block 2, and the pair of heat transfer plates 3, 3 are fixed to prescribed positions of the body block 2 in such a manner to hold both sides of the body block 2 by mutually fixing by means of unshown bolts, nuts and springs.

As described above, the heat transfer plates 3 are disposed on the surfaces 2a of the body block 2 to cover the flow passage grooves 2g of the body block 2 with the heat transfer plates 3 (corrosion-resisting plates 3P). Thus, the each flow passage 2P is formed between the body block 2 and the heat transfer plate 3.

Three heaters 4 are disposed within the heat transfer plates 3, the Peltier module 5 is held on the outer surface of each heat transfer plate 3 so to be sandwiched between the heat transfer plate 3 and the water jacket 6 as described above, and the Peltier module 5 is thermally connected to the heat transfer plate 3 and the water jacket 6 via an insulating layer (not shown). In addition, the heaters 4 disposed within the heat transfer plates 3 are each arranged between the body block 2 and one of the Peltier modules 5, with the body block 2 and the Peltier modules 5 opposing each other via the heat transfer plates 3. Further, as shown in FIG. 1, all of the heaters 4 are arranged only within an area in which the Peltier modules 5 and the body block 2 oppose each other across the heat transfer plates 3.

Here, the three heaters 4 are disposed within the heat transfer plates 3 to uniformize a temperature distribution on the heat transfer plates 3, and a heating value (heating capability) of the heater 4 disposed in the each heat transfer plate 3, more specifically a total heating value of the three heaters 4, is set to be larger than a heating value (heating capability) of the Peltier module 5 which is in contact with the heat transfer plate 3.

In the above-configured fluid temperature control device 1, the chemical solution, which is introduced into the feed pipe 21 as indicated by an arrow i and flown into the flow passage 2P, is flown through the flow passage 2P in contact with the heat transfer plate 3 (the corrosion-resisting plate 3P), adjusted its temperature by heat conduction from the heat transfer plate 3 whose temperature is adjusted by heating by the heaters 4 and heating/cooling by the Peltier module 5, and discharged out of the device as indicated by an arrow o from the flow passage 2P through the discharge pipe 20.

To increase the temperature of the chemical solution by the fluid temperature control device 1, an electric current is passed to the heaters 4 to heat the heat transfer plate 3 such that the side of the Peltier module 5 in contact with the heat transfer plate 3 radiates heat and its side in contact with the water jacket 6 absorbs heat.

Meanwhile, to decrease the temperature of the chemical solution by the fluid temperature control device 1, the electric current to the heaters 4 is cut off to stop heating of the heat transfer plate 3 by the heaters 4, and the heat transfer plate 3 is cooled by electrifying such that the side of the heat transfer plate 3 in contact with the Peltier module 5 absorbs heat and its side in contact with the water jacket 6 generates heat.

Incidentally, it is needless to mention that the temperature of the chemical solution is measured by a sensor (not shown), and the operations of the heaters 4 and the Peltier modules 5 are controlled by an unshown controller so that its temperature becomes a desired temperature.

Since the Peltier module 5 has a characteristic that its life is shortened at a particular temperature or more, it is effective that the temperature of the outer surface (the surface in contact with the Peltier module 5) of the heat transfer plate 3 is measured by the sensor 3S, and the operations of the heaters 4 and the Peltier module 5 are controlled so that the temperature of the heat transfer plate 3 becomes a temperature or lower not to affect on the Peltier module 5.

Figure 4:
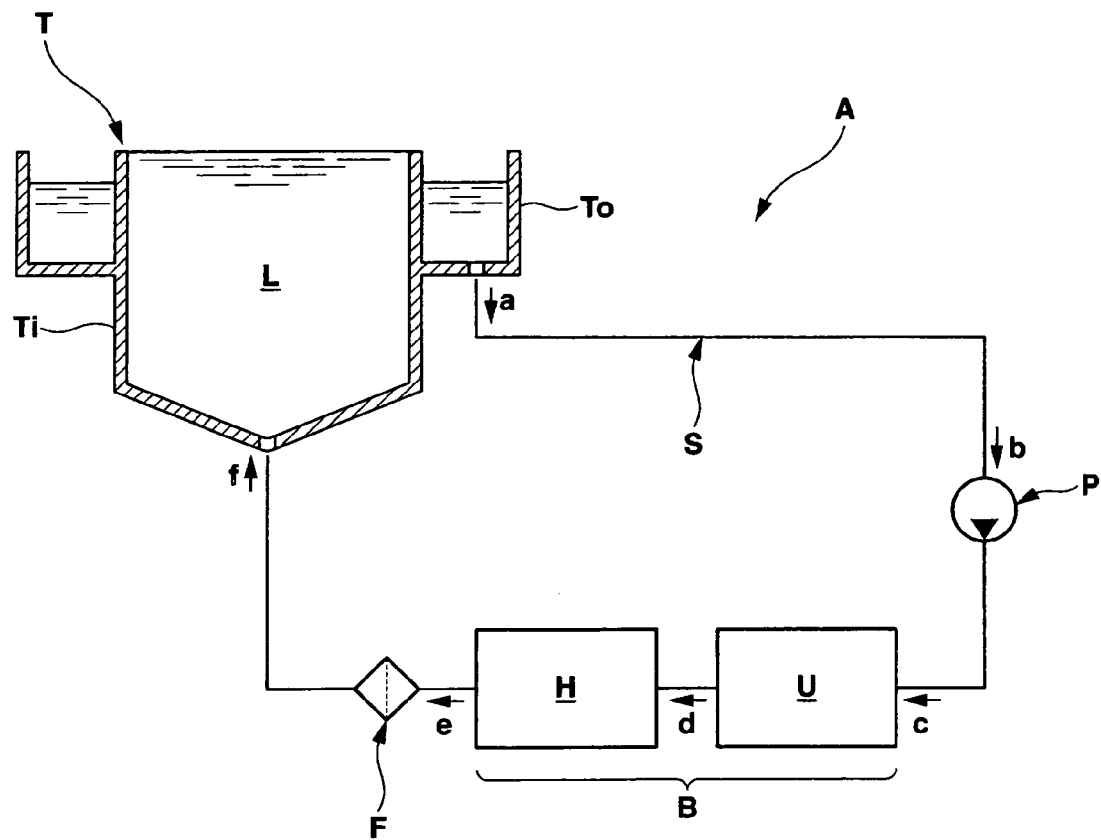
FIG. 4 is a conceptual view showing a conventional fluid temperature control device.

According to the above-configured fluid temperature control device 1, the chemical solution is heated by the heaters 4 via the heat transfer plate 3 which faces the flow passage 2P and also heated/cooled by the Peltier module 4 via the heat transfer plate 3, so that the temperature of the chemical solution can be adjusted quickly and precisely in comparison with the conventional fluid temperature control device (see FIG. 4) which sends the temperature-controlled fluid heated/cooled by the electronic cooling/heating unit to the heater to heat it.

According to the above-configured fluid temperature control device 1, the heaters 4 for heating the chemical solution via the heat transfer plate 3 which is disposed on the surface 2a of the body block 2 are disposed within the heat transfer plate 3, and the Peltier module 5 which heats/cools the chemical solution via the heat transfer plate 3 is disposed in contact with the heat transfer plate 3. Therefore, the body block 2, the heat transfer plate 3, the heaters 4 and the Peltier module 5 are disposed very close to one another, and the fluid temperature control device 1 can be made as small as possible.

Figure 2:
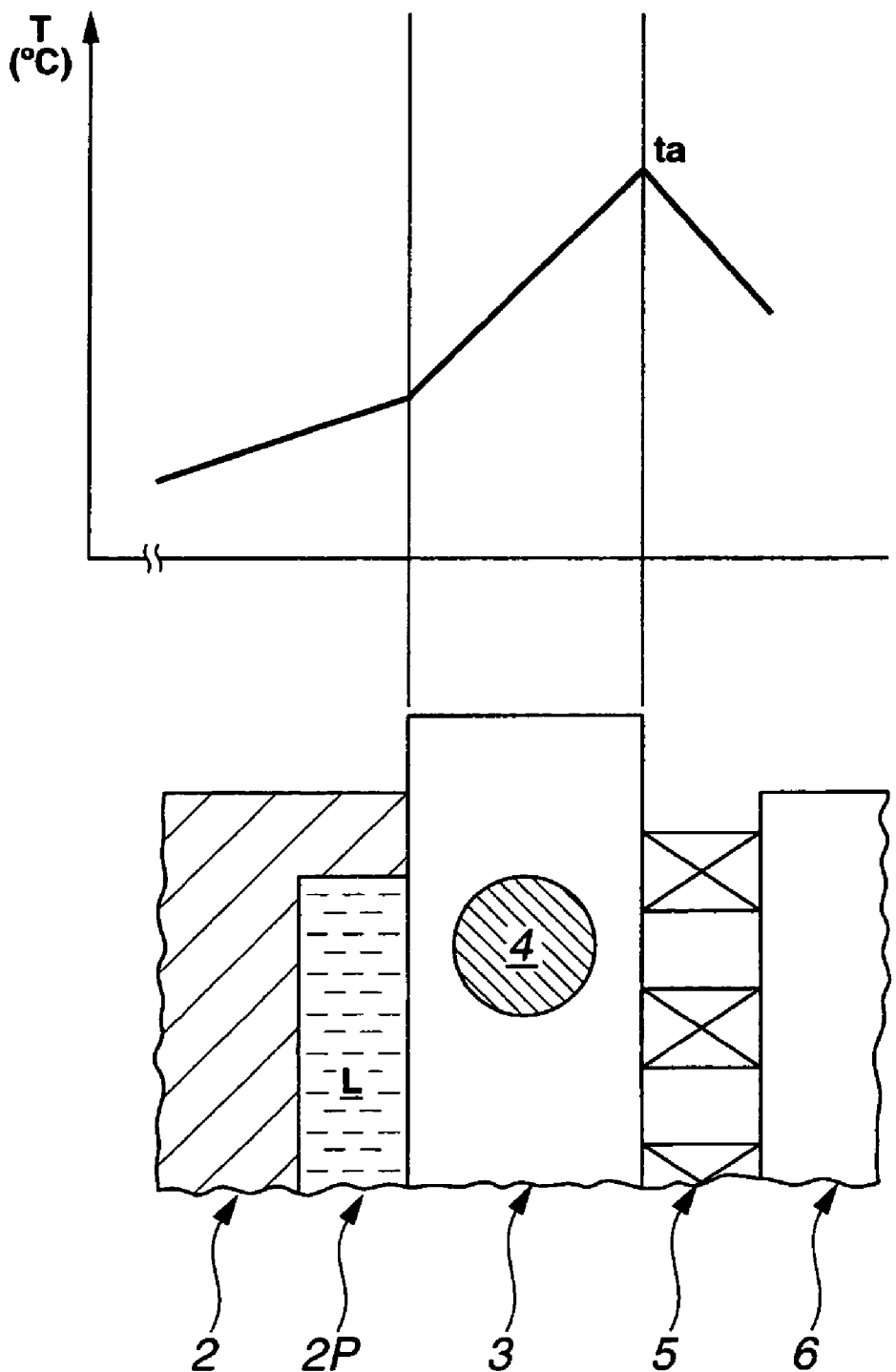
FIG. 2 is a perspective view showing a temperature gradient of a flow passage block, a heat transfer plate, a thermoelectric conversion module and a cooling plate in the fluid temperature control device of FIG. 1.

According to the above-configured fluid temperature control device 1, the heaters 4 are disposed within the heat transfer plate 3 which faces the flow passage 2P, and the Peltier module 5 is disposed on the outer surface of the heat transfer plate 3. Therefore, to heat the chemical solution which flows through the flow passage 2P, the heat transfer plate 3 is heated by the heaters 4 and the Peltier module 5 as described above, and a temperature gradient among the body block 2, the heat transfer plate 3 and the Peltier module 5 becomes as indicated by a solid line in FIG. 2.

In other words, an interface between the heat transfer plate 3 and the Peltier module 5 has a maximum temperature point ta, and the heat quantity of the heaters 4 is not absorbed by cooling water within the water jacket 6 via the Peltier module 5. Thus, the chemical solution L in the flow passage 2P is heated efficiently by the heat quantity from the heaters 4 via the heat transfer plate 3.

According to the above-configured fluid temperature control device 1, the heating capabilities of the heaters 4 upon the chemical solution are set to be higher than those of the Peltier modules 5 upon the chemical solution. Thus, when the chemical solution is heated by the heaters 4 and the Peltier modules 5, the temperatures of the Peltier modules 5 on the heating side can be suppressed to a low level.

For example, even if the heaters 4 and the Peltier modules 5 have the same total heating value of 2 kw, the temperature on the heating side of the Peltier module 5 increases to 110° C. when it is set that the heating capability of the heaters 4 is 1 kw and the heating capability of the Peltier modules 5 is 1 kw, and the temperature on the heating side of the Peltier module 5 is suppressed to 100° C. when it is set that the heating capability of the heaters is 41.2 kw and the heating capability of the Peltier module 5 is 0.8 kw.

Thus, since the heating capability of the heater 4 is set to be higher than that of the Peltier module 5, the temperature on the heating side of the Peltier module 5 is suppressed to a low level, and the life of the thermoelectric module can be prevented from decreasing because of an unexpected increase in junction temperature.

To increase the temperature of the chemical solution by the above-described fluid temperature control device 1, the heat transfer plates 3 are heated by the heaters 4 and the Peltier modules 5 as described above, but when the chemical solution reaches a desired temperature, the electric current to the heaters 4 is cut off, and the temperature of the chemical solution is adjusted by only the Peltier modules 5.

Here, if the temperature of the chemical solution is decreased by external disturbances and its change amount is less than 1° C., the temperature is adjusted by only the Peltier modules 5, and if the change amount is 1° C. or more and 10° C. or less, it is desirable to adjust the temperature by the Peltier modules 5 and the heaters 4.

The above-described fluid temperature control device 1 has the heat transfer plate 3 (heaters 4), the Peltier module 5 and the water jacket on either side of the body block 2. But it is needless to say that the fluid temperature control device may be configured by forming the flow passage groove 2g in one surface 2a of the body block 2 and disposing the heat transfer plate 3 (heaters 4), the Peltier module 5 and the water jacket on the surface 2a only.

Figure 3:
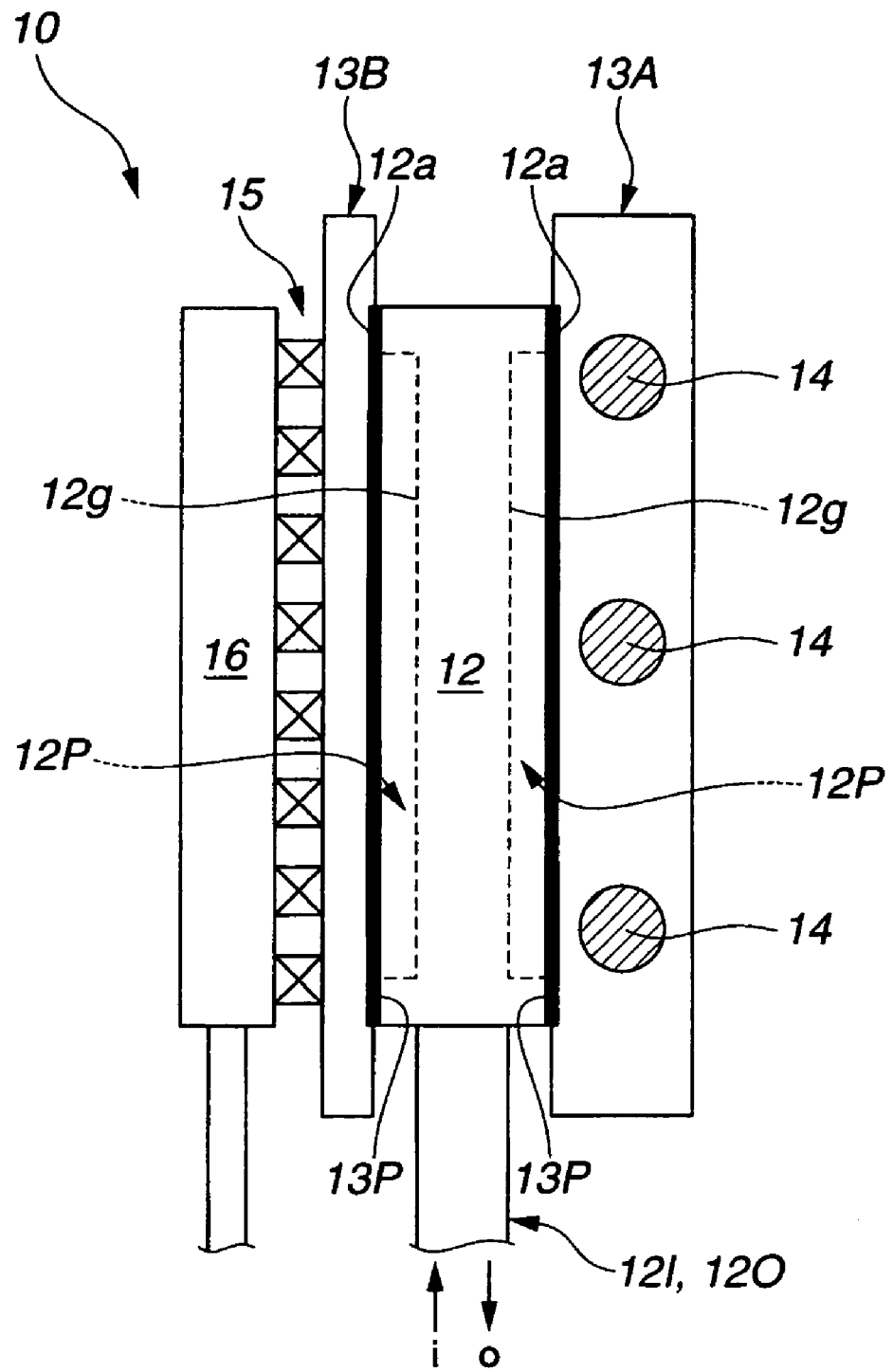
FIG. 3 is a schematic entire plan view showing another embodiment of the fluid temperature control device of the invention.

FIG. 3 shows another embodiment of the fluid temperature control device according to the invention, and the fluid temperature control device 10 has a body block 12 where a chemical solution is fed/discharged, a heat transfer plate 13A which is placed on one surface 12a of the body block 12 and a heat transfer plate 13B which is placed on another surface 12a of the body block 12.

Three heaters 14 are disposed within the heat transfer plate 13A, a Peltier module (thermoelectric module) 15 is attached to an outer surface of the heat transfer plate 13B, and a water jacket 16 which performs heat radiation removal/heat supply of the Peltier module 15 is attached to an outer surface of the Peltier module 15.

A flow passage 12P is formed between the body block 12 and the heat transfer plates 13A, 13B, the chemical solution which flows through the flow passage 12P comes into contact with the heat transfer plates 13A, 13B, and heat exchange is performed between the heaters 14 and the Peltier module 15 and the chemical solution via the heat transfer plates 13A, 13B. Thus, the temperature of the chemical solution is adjusted.

The fluid temperature control device 10 is basically configured in the same manner as the fluid temperature control device 1 shown in FIG. 1 except that the heat transfer plate 13A having the heaters 14 therein is disposed on one of the surfaces 12a of the body block 12, and the heat transfer plate 13B provided with the Peltier module 15 and the water jacket 16 is disposed on the other surface 12a of the body block 12. Therefore, the component elements of the fluid temperature control device 10, which function in the same manner as those of the fluid temperature control device 1, are denoted by like reference numerals (in the 10s) with 10 added to the reference numerals of FIG. 1 and detailed descriptions thereof are omitted.

According to the above-configured fluid temperature control device 10, the chemical solution is heated by the heaters 14 via the heat transfer plate 13A which faces one of the flow passages 12P, and the chemical solution is heated/cooled by the Peltier module 15 via the heat transfer plate 13B which faces the other flow passage 12P. Therefore, it becomes possible to adjust the temperature of the chemical solution quickly and precisely in comparison with the conventional fluid temperature control device which sends the temperature-controlled fluid, which is heated/cooled by the electronic cooling/heating unit, to the heater to heat it (see FIG. 4).

According to the above-configured fluid temperature control device 10, the heaters 14 which heat the chemical solution via the heat transfer plate 13A, which is disposed on the surface 12a of the body block 12, are disposed within the heat transfer plate 13A, and the Peltier module 15 which heats/cools the chemical solution via the heat transfer plate 13B is disposed in contact with the heat transfer plate 13B. Therefore, the body block 12, the heat transfer plates 13A, 13B, the heaters 14 and the Peltier module 15 are disposed very close to one another, and the fluid temperature control device 10 can be made as small as possible.

Here, the above-described fluid temperature control device 10 has the heat transfer plate 13A, which has the heaters 14 therein and is disposed on one of the surfaces 12a of the body block 12, and the heat transfer plate 13B which is provided with the Peltier module 15 and the water jacket 16 and disposed on the other surface 12a of the body block 12. But, it is also possible to symmetrically dispose the body block 12, the heat transfer plate 13B, the Peltier module 15 and the water jacket 16 on both sides of the heat transfer plate 13A to configure the fluid temperature control device.

According to the above-configured fluid temperature control device, the chemical solution in the right and left flow passages 12P, 12P which have the heat transfer plate 13A therebetween can be heated efficiently by the heat generation of the heaters 14. And, the heat generated by the heaters 14 is not radiated to one side (the right side in the drawing) of the heat transfer plate 13A, and it is not necessary to take a heat insulation treatment. Thus, the structure can be made simple.

In the above-described embodiments were described examples of applying the fluid temperature control device of the invention to the temperature adjustment of the chemical solution which is used in the wet process (RCA cleaning), wet etching or the like related to the manufacturing of the semiconductor device. And, it is a matter of course that the fluid temperature control device of the invention can be also applied effectively to the temperature control of the chemical solution in various manufacturing processes.

The examples of applying the present invention to the semiconductor device manufacturing field were described in the above-described embodiments, but it is needless to say that the fluid temperature control device of the invention can be applied effectively to various facilities in various types of industrial fields requiring precise temperature adjustment.

What is claimed is:

1. A fluid temperature control device, comprising:
a body block having flow passage grooves formed therein;
heat transfer plates which are disposed on surfaces of the body block to form flow passages through which a temperature-controlled fluid flows;
heaters which heat the temperature-controlled fluid flowing through the flow passages via at least one of the heat transfer plates;
thermoelectric modules which heat and cool the temperature-controlled fluid flowing through the flow passages via at least one of the heat transfer plates, the thermoelectric modules being thermally connected to the heat transfer plates via an insulating layer;
a water jacket thermally connected to the thermoelectric modules via the insulating layer; and
a sensor for measuring a temperature of an outer surface of one of the heat transfer plates, the outer surface being in contact with one of the thermoelectric modules,
wherein heating capabilities of the heaters upon the temperature-controlled fluid are set to be higher than those of the thermoelectric modules upon the temperature-controlled fluid.

2. The fluid temperature control device according to claim 1, wherein the thermoelectric modules are disposed on an outer surface of at least one of the heat transfer plates.

3. The fluid temperature control device according to claim 2, wherein three heaters are provided within at least one of the heat transfer plates.

4. The fluid temperature control device according to claim 1, wherein three heaters are provided within at least one of the heat transfer plates.

* * * * *